(12) United States Patent
Wang

(10) Patent No.: US 12,296,947 B2
(45) Date of Patent: May 13, 2025

(54) METHOD FOR TRANSMITTING POWER BASED ON AERODYNAMIC DECELERATION, STRUCTURE AND APPLICATION THEREOF

(71) Applicant: Foshen Shenfeng Aviation Technology Co., Ltd., Guangdong (CN)

(72) Inventor: Zhicheng Wang, Foshen (CN)

(73) Assignee: Fangsen Intelligent Technology (Foshan) Co., Ltd., Foshen (CN)

( * ) Notice: Subject to any disclaimer, the term of this patent is extended or adjusted under 35 U.S.C. 154(b) by 0 days.

(21) Appl. No.: 18/226,850

(22) Filed: Jul. 27, 2023

(65) Prior Publication Data

US 2024/0092482 A1 Mar. 21, 2024

(51) Int. Cl.
*B64C 27/16* (2006.01)
*B64C 11/48* (2006.01)
*B64C 27/10* (2023.01)

(52) U.S. Cl.
CPC .............. *B64C 27/16* (2013.01); *B64C 11/48* (2013.01); *B64C 27/10* (2013.01)

(58) Field of Classification Search
CPC ......... B64C 27/10; B64C 27/16; B64C 11/46; B64C 11/48; B64U 30/24
See application file for complete search history.

(56) References Cited

U.S. PATENT DOCUMENTS

| | | | | |
|---|---|---|---|---|
| 1,274,886 A | * | 8/1918 | Jacobson | ................ B64C 27/16 416/99 |
| 2015/0158581 A1 | * | 6/2015 | Fengler | ................... B64C 27/16 244/17.23 |

* cited by examiner

*Primary Examiner* — Nicholas McFall
(74) *Attorney, Agent, or Firm* — Jose Cherson Weissbrot

(57) ABSTRACT

A method for transmitting power based on aerodynamic deceleration, a structure and an application thereof; a method for transmitting power based on aerodynamic deceleration is to propel a large rotor wing without driving force to rotate using an airflow generated by the rotation of small rotor wings with driving force; a structure for transmitting power based on aerodynamic deceleration, includes a large rotor wing, a small rotor wing, a main shaft and a power assembly; the large rotor wing is rotatably connected to the main shaft, and the large rotor wing rotates around the main shaft; the small rotor wing is connected to the power assembly.

12 Claims, 8 Drawing Sheets

METHOD FOR TRANSMITTING POWER BASED ON AERODYNAMIC DECELERATION, STRUCTURE AND APPLICATION THEREOF

TECHNICAL FIELD

This invention generally relates to the technical field of aviation (a rotor-wing-type low-altitude rotorcraft technology), and more particularly, to a method for transmitting power based on aerodynamic deceleration, a structure and an application thereof.

BACKGROUND

Because the rotation speeds of the output shafts of existing engines (including motors and internal combustion engines, etc.) are high, reaching thousands of revolutions or even tens of thousands of revolutions per minute, the aerodynamic force generated by directly propelling rotor wings is small, and cannot meet the requirement of a large lifting force. Therefore, to obtain sufficient lifting force, all helicopters adopt complex deceleration systems for decelerating high-speed engines, thereby propelling large rotor wings to rotate such that a greater lifting force is achieved. However, the aforesaid design results in complex structure, high cost, high failure rate and complex operation.

For example, for conventional single-rotor helicopters, the power is transmitted to a shaft by an engine after deceleration, and the rotor wings are further propelled by the shaft. Meanwhile, a tail rotor is needed for balancing the anti-torque, resulting in complex structure, high difficulty of control, low safety, high energy loss caused by the wind and low efficiency.

For conventional gyrocopters, there are two types of pre-rotation rotor devices: one is to transmit power by an engine after deceleration to the rotor wings at the top of the gyrocopter along a mast from a flexible shaft, and the other is to transmit power by a motor to the rotor wings after deceleration. Both the two pre-rotation modes need a clutch device and a deceleration device, resulting in complex structure, difficult vertical take-off and landing, and difficult hovering.

Although a multi-axis aircraft such as a four-axis unmanned aerial vehicle achieves a simple structure and easily-controlled flight attitudes (controlled by a flight control device), it may fail when a motor, an electronic speed regulator, a wing or a controller fails. Even worse, it is vulnerable to electromagnetic or electronic interferences or hacker attacks, resulting in poor ability of forced landing, low safety and low reliability.

SUMMARY

The purpose of the present invention is to provide a method for transmitting power based on aerodynamic deceleration, a structure and an application thereof. According to the present invention, a part of energy of the small rotor wings is transmitted to the large rotor wings in an aerodynamic mode, so that the problems relating to complex structure and high failure rate caused by the transmission mode of a conventional rotorcraft using a flexible shaft in a pre-rotation device or a motor plus deceleration gears are solved. Moreover, through adopting the present invention, variable rotation speeds and high adaptability are achieved and the engine is prevented from failing due to overload.

To achieve the above purpose, the present invention adopts the following technical solution: a method for transmitting power based on aerodynamic deceleration is to propel a large rotor wing without driving force to rotate using an airflow generated by the rotation of small rotor wings with driving force.

A structure for transmitting power based on aerodynamic deceleration, comprising a large rotor wing, a small rotor wing, a main shaft and a power assembly. The large rotor wing is rotatably connected to the main shaft, and the large rotor wing rotates freely around the main shaft. The small rotor wing is connected to the power assembly. The rotation plane of the large rotor wing and the rotation plane of the small rotor wing are located on horizontal planes at different heights and are parallel to each other, which enables the small rotor wing to rotate to generate an airflow such that the large rotor wing is propelled to rotate.

In another preferred embodiment of the present invention, the clearance distance between the small rotor wing and the large rotor wing is less than or equal to three times the maximum chord length of the large rotor wing. The blades of the large rotor wing are configured to be airfoil-shaped, and the included angle between the chord line of the blades of the large rotor wing and the rotation plane of the large rotor wing is defined as the mounting angle of the blades of the large rotor wing. When the front edge of the blades of the large rotor wing is higher than the rear edge of the large rotor wing, the mounting angle is positive, and when the front edge of the blades of the large rotor wing is lower than the rear edge of the large rotor wing, the mounting angle is negative. The mounting angle of the blades of the large rotor wing ranges from −2° to 6°.

In another preferred embodiment of the present invention, the mounting angle of the blades of the large rotor wing within the projection area of the small rotor wing ranges from 0° to 6°, and the mounting angle of the blades of the large rotor wing outside the projection area of the small rotor wing ranges from −2° to 6°.

In another preferred embodiment of the present invention, the number of the large rotor wing is one and the number of the small rotor wing is also one, wherein the small rotor wing and the large rotor wing are coaxially arranged. The small rotor wing is arranged above the large rotor wing, and the generated airflow is directed to the large rotor wing from the small rotor wing. Namely, the small rotor wing blows air to the large rotor wing to make the large rotor wing rotate passively. Alternatively, the small rotor wing is arranged below the large rotor wing, and the generated airflow is directed to the small rotor wing from the large rotor wing. Namely, the central area of the large rotor wing is in the airflow generated by the sucking of the small rotor wing, and the large rotor wing passively rotates under the action of the airflow generated by the small rotor wing.

In another preferred embodiment of the present invention, the number of the large rotor wing is one, the number of the small rotor wing is two, and the small rotor wings and the large rotor wing are coaxially arranged. The two small rotor wings are respectively arranged above and below the large rotor wing, wherein the small rotor wing arranged above the large rotor wing blows air downwards to the large rotor wing, and the small rotor wing arranged below the large rotor wing sucks air from the large rotor wing. The airflow directions of small rotor wings arranged above and below the large rotor wing are from top to bottom, thereby enabling the large rotor wing to rotate passively. The rotation directions of the upper small rotor wing and the lower small rotor wing are opposite, so that the anti-torques of the two small rotor wings are counteracted and good balance is achieved.

In another preferred embodiment of the present invention, there are a plurality of small rotor wings and one large rotor wing. The plurality of small rotor wings and the large rotor wing are non-coaxially arranged, and the plurality of small rotor wings are evenly distributed around the axis of the rotating shaft of the large rotor wing and are close to the axis of the rotating shaft of the large rotor wing. The plurality of small rotor wings is all arranged above the large rotor wing, and the projections of all the small rotor wings on the rotation plane of the large rotor wing are located in the middle area of the rotation plane of the large rotor wing. All the small rotor wings blow air downwards to the large rotor wing, enabling the large rotor wing to rotate passively. Alternatively, the plurality of small rotor wings is all arranged below the large rotor wing, and all the small rotor wings blows air downwards, namely, sucking air upwards facing the large rotor wings, thereby enabling the large rotor wing to rotate passively. Alternatively, the plurality of small rotor wings is arranged above and below the large rotor wing, wherein the plurality of small rotor wings is evenly distributed around the axis of the rotating shaft of the large rotor wing and are close to the axis of the rotating shaft of the large rotor wing. The small rotor wings arranged above the large rotor wing blow air to the large rotor wing, the small rotor wings arranged below the large rotor wing suck air from the large rotor wing, and the downward airflows enable the large rotor wing to rotate.

In another preferred embodiment of the present invention, there are two large rotor wings and a plurality of small rotor wings, wherein the small rotor wings and the large rotor wings are non-coaxially arranged. The rotation plane of the large rotor wing and the rotation plane of the small rotor wing are located on horizontal planes at different heights and are parallel to each other. The rotation planes of the two large rotor wings are respectively located on horizontal planes at different heights. The plurality of small rotor wings is equally divided into two groups. The projection of one group of small rotor wings on the rotation plane of one of the large rotor wings is located in the middle area of the rotation plane of the corresponding large rotor wing. The projection of the other group of small rotor wings on the rotation plane of the other large rotor wing is located in the middle area of the rotation plane of the corresponding large rotor wing. The rotation directions of the two groups of small rotor wings are opposite.

In another preferred embodiment of the present invention, the power assembly is an outer-rotor motor.

In another preferred embodiment of the present invention, in the same structure, the sum of the rotation areas of all the small rotor wings is less than one half of the sum of the rotation areas of all the large rotor wings.

A rotorcraft possessing both active and passive rotation modes is an application of the driving method of the aforesaid rotor wings. This rotorcraft comprises a fuselage, a propelling device and a landing gear. The fuselage is provided with the aforesaid rotor wing driving structure for transmitting power based on aerodynamic deceleration.

In another preferred embodiment of the present invention, the landing gear is a sled-type landing gear or a wheeled landing gear.

In another preferred embodiment of the present invention, the fuselage comprises fixed rotor wings and a tail wing assembly.

In another preferred embodiment of the present invention, the fuselage comprises a tilting rotor wing, wherein the tilting rotor wing is rotatably connected to the fuselage. There is a plurality of small rotor wings, and the small rotor wings and the large rotor wings are in a non-coaxial arrangement. Some of the small rotor wings are connected to the tilting rotor wing and are capable of tilting along with the tilting rotor wing for improving a lifting force and pushing force. Other small rotor wings are connected around the fuselage to generate a lifting force.

Compared with the prior art, the present invention has the following advantages: a part of energy of the small rotor wings is transmitted to the large rotor wings in an aerodynamic mode;

1) The technical problem relating to the complex mechanical transmission structure of helicopters is solved; the lifting force of a helicopter mainly comes from the outer section of the rotor wings, namely, an end far from the wing root;
2) The technical problems relating to complex structure and high failure rate caused by the transmission mode of a conventional rotorcraft using a flexible shaft in a pre-rotation device or a motor plus deceleration gears are solved;
3) For a multi-axis aircraft, unsafe factors still exist; through adopting the present invention, the problem of difficult forced landing of the multi-axis aircraft is solved; it resembles the effect of a parachute and is capable of generating a lifting force during cruising.
4) The present invention provides a novel low-altitude rotorcraft capable of vertically taking-off, landing and hovering, achieving high efficiency and high safety.

BRIEF DESCRIPTION OF THE DRAWINGS

The drawings are used to achieve a further understanding of the present invention, which are combined with the embodiments to elaborate the technical solution of the present invention and are not intended to limit the present invention.

In Figures.

Figure 1:
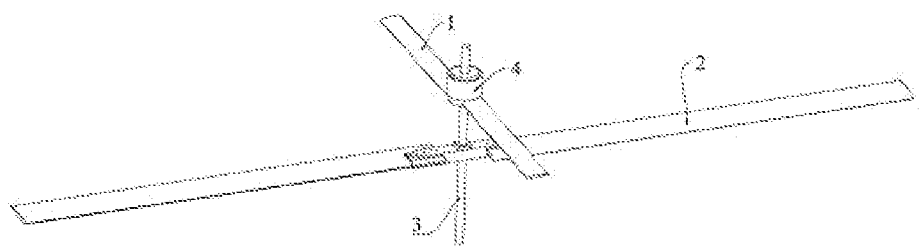
FIG. 1 is a schematic diagram illustrating an exemplary structure of the rotor wing driving structure in embodiment 1 of the present invention.

0—Fuselage, 1—Small Rotor Wing, 2—Large Rotor Wing, 3—Main Shaft, 4—Power Assembly, 5—Propelling Device, 6—Tail Wing Assembly, 7—Landing Gear.

DETAILED DESCRIPTION

Drawings are combined hereinafter to describe the preferred embodiments of the present invention. It should be understood that the preferred embodiments described herein are merely used to illustrate the present invention and are not intended to limit the present invention.

A method for transmitting power based on aerodynamic deceleration, in particular, is to propel a large rotor wing without driving force to rotate using an airflow generated by the rotation of a small rotor wing with driving force. The large rotor wing is freely rotatably mounted on a main shaft by means of a bearing, and the small rotor wing is connected to a power assembly and is powered by the power assembly. The number of the small rotor wing is not less than one, and the rotation plane of the small rotor wing is substantially horizontal to the rotation plane of the large rotor wing. The small rotor wing and the large rotor wing may be coaxially arranged (namely, the axes of their rotating shafts are overlapped with each other), or may be non-coaxially arranged (when not coaxially arranged, the number of small rotor wings is not less than two, and the small rotor wings are evenly distributed around the axis of the rotating shaft of the large rotor wing and are close to the axis of the rotating shaft of the large rotor wing). The small rotor wings are located above or below the large rotor wing, or the small rotor wings are arranged above and below the large rotor wing.

When the small rotor wing is located above the large rotor wing, the small rotor wing is propelled by the power assembly to rotate to generate an airflow flowing downwards to the large rotor wing, and this airflow enables the large rotor wing to rotate to generate a larger airflow. Alternatively, when the small rotor wing is located below the large rotor wing, the small rotor wing is propelled by the power assembly to rotate to generate an airflow flowing downwards and away from the large rotor wing. Namely, the rotation of the small rotor wing extracts air from top to bottom, which allows the large rotor wing to rotate and generate a larger airflow. Both the two airflows generated by the large rotor wing flow towards the ground. Namely, a greater lifting force is therefore generated. When this method is applied to rotorcrafts, a safer and more efficient operation is achieved.

By means of this method, the technical problem relating to transmitting power to propel a large rotor wing to rotate through complex mechanical transmission devices (especially the deceleration gears) is solved. Moreover, the traditional power transmission mode has the shortcomings including complex structure, high cost, high failure rate and large anti-torque, which requires a large enough tail rotor to balance the anti-torque. The method of the present invention is novel and capable of solving the prior technical problem. Because the large rotor wing adopts an autorotation structure, high safety is achieved.

FIGS. 1-5 are the schematic diagrams illustrating a structure for transmitting power based on aerodynamic deceleration of the present invention. The structure for transmitting power based on aerodynamic deceleration comprises a large rotor wing 2, a small rotor wing 1, a main shaft 3 and a power assembly 4. The power assembly 4 further comprises a motor, a battery and an electronic speed regulator. The battery is electrically connected to the electronic speed regulator, the electronic speed regulator is electrically connected to the motor, the battery supplies power to the motor, and the electronic speed regulator controls the rotating speed of the motor. The small rotor wing 1 is mounted on the motor, and the motor propels the small rotor wing 1 to rotate at a high speed.

The large rotor wing 2 is rotatably connected to the main shaft 3 through a bearing, and the large rotor wing 2 rotates freely around the main shaft 3. Its structural principle resembles that of an existing auto rotorcraft. The small rotor wing 1 is connected to the power assembly 4.

The rotation plane of the large rotor wing 2 and the rotation plane of the small rotor wing 1 are located on horizontal planes at different heights and are parallel to each other, which enables the small rotor wing 1 to rotate to generate an airflow such that the large rotor wing 2 is propelled to rotate.

To ensure the driving efficiency, the clearance distance between the small rotor wing 1 and the large rotor wing 2 is less than or equal to three times the maximum chord length of the large rotor wing 2.

Additionally, to ensure the rotation of the large rotor wing 2, the blades of the large rotor wing 2 are configured to be airfoil-shaped, and the included angle between the chord line of the blades of the large rotor wing 2 and the rotation plane of the large rotor wing 2 is defined as the mounting angle of the blades of the large rotor wing 2. When the front edge of the blades of the large rotor wing 2 is higher than the rear edge of the large rotor wing 2, the mounting angle is positive, and when the front edge of the blades of the large rotor wing 2 is lower than the rear edge of the large rotor wing 2, the mounting angle is negative. The mounting angle of the blades of the large rotor wing 2 ranges from −2° to 6°.

Further, the mounting angle of the blades of the large rotor wing 2 within the projection area of the small rotor wing 1 ranges from 0° to 6°, and the mounting angle of the blades of the large rotor wing 2 outside the projection area of the small rotor wing 1 ranges from −2° to 6°.

Figure 2:
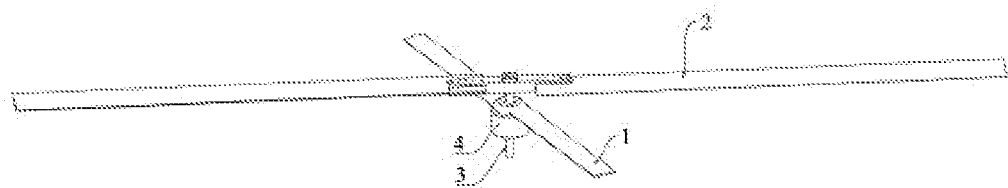
FIG. 2 is a schematic diagram illustrating an exemplary structure of the rotor wing driving structure in embodiment 2 of the present invention.
Figure 3:
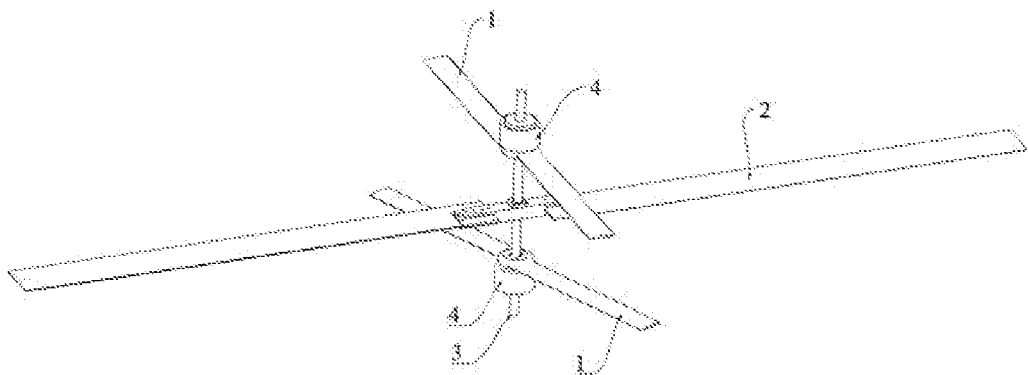
FIG. 3 is a schematic diagram illustrating an exemplary structure of the rotor wing driving structure in embodiment 3 of the present invention.

FIGS. 1-3 show different embodiments of different structures in which the large rotor wing 2 and the small rotor wing 1 are coaxially arranged.

FIG. 1 is a schematic diagram illustrating a rotor wing driving structure in embodiment 1. In this embodiment, the number of the large rotor wing 2 is one and the number of the small rotor wing 1 is also one, wherein the small rotor wing 1 and the large rotor wing 2 are coaxially arranged.

The large rotor wing 2 is rotatably connected to the main shaft 3 through a bearing, the power assembly 4 adopts an outer-rotor motor, and an axial-center through hole is formed in the middle of the outer-rotor motor. The main shaft 3 passes through the axial-center through hole. A stator of the outer-rotor motor and the main shaft 3 are in a fixed structure, and the small rotor wing 1 is fixedly connected to a rotor of the outer-rotor motor.

The small rotor wing 1 is arranged above the large rotor wing 2, the small rotor wing 1 rotates under the action of the power assembly 4, and the generated airflow is directed to the large rotor wing 2 from the small rotor wing 1. Namely, the small rotor wing 1 blows air to the large rotor wing 2 to make the large rotor wing 2 rotate passively. When the large rotor wing 2 rotates, a larger airflow is generated at the periphery of the large rotor wing 2, and the small rotor wing 1 generates a large lifting force outside the projection area of the large rotor wing 2, namely, the peripheral area of the large rotor wing 2.

FIG. 2 is a schematic diagram illustrating a rotor wing driving structure in embodiment 2. The difference between embodiment 1 and embodiment 2 is that, in embodiment 2, the small rotor wing 1 is arranged below the large rotor wing 2. When the small rotor wing 1 rotates under the action of the power assembly 4, the generated airflow is directed to the small rotor wing 1 from the large rotor wing 2. Namely, the central area of the large rotor wing 2 is in the airflow generated by the sucking of the small rotor wing 1, and the large rotor wing 2 passively rotates under the action of the airflow generated by the small rotor wing 1. In this way, the large rotor wing 2 rotates to generate a larger airflow, and the peripheral area of the large rotor wing 2 generates a large lifting force.

FIG. 3 is a schematic diagram illustrating a rotor wing driving structure in embodiment 3. What differentiates embodiment 3 from embodiment 1 and embodiment 2 is that, in embodiment 3, the number of the large rotor wing 2 is one, the number of the small rotor wing 1 is two, and the small rotor wings 1 and the large rotor wing 2 are coaxially arranged.

The two small rotor wings 1 are respectively arranged above and below the large rotor wing 2, wherein the small rotor wing 1 arranged above the large rotor wing 2 blows air downwards to the large rotor wing 2, and the small rotor wing 1 arranged below the large rotor wing 2 sucks air from the large rotor wing 2. The airflow directions of small rotor wings 1 arranged above and below the large rotor wing 2 are from top to bottom, thereby enabling the large rotor wing 2 to rotate passively. The rotation directions of the upper small rotor wing 1 and the lower small rotor wing 1 are opposite, so that the anti-torques of the two small rotor wings 1 are counteracted. The periphery of the large rotor wing 2 generates a greater lifting force than the small rotor wing 1.

Figure 4:
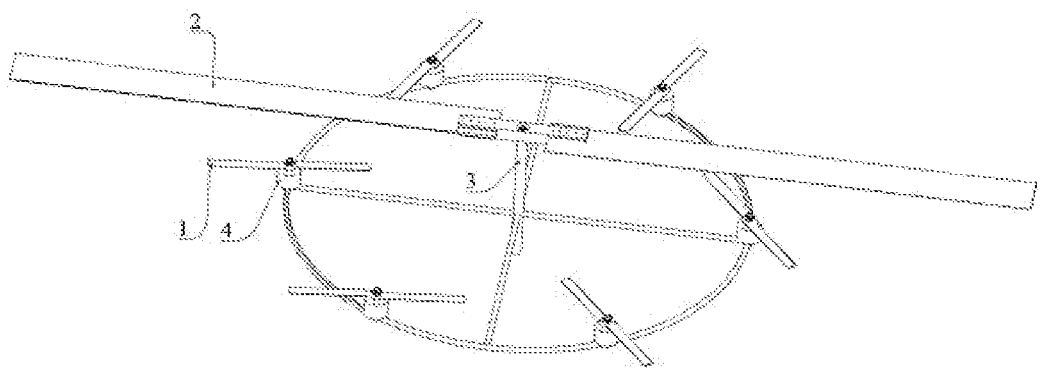
FIG. 4 is a schematic diagram illustrating an exemplary structure of the rotor wing driving structure in embodiment 4 of the present invention.
Figure 5:
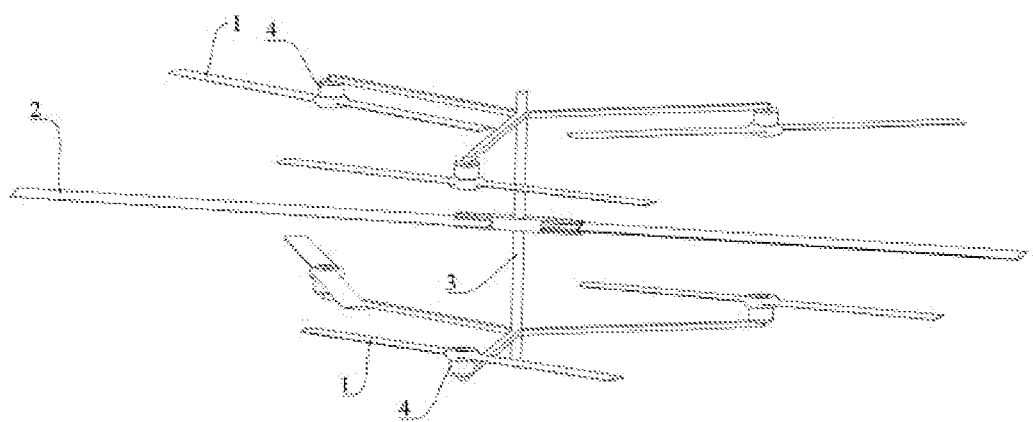
FIG. 5 is a schematic diagram illustrating an exemplary structure of the rotor wing driving structure in embodiment 5 of the present invention.
Figure 6:
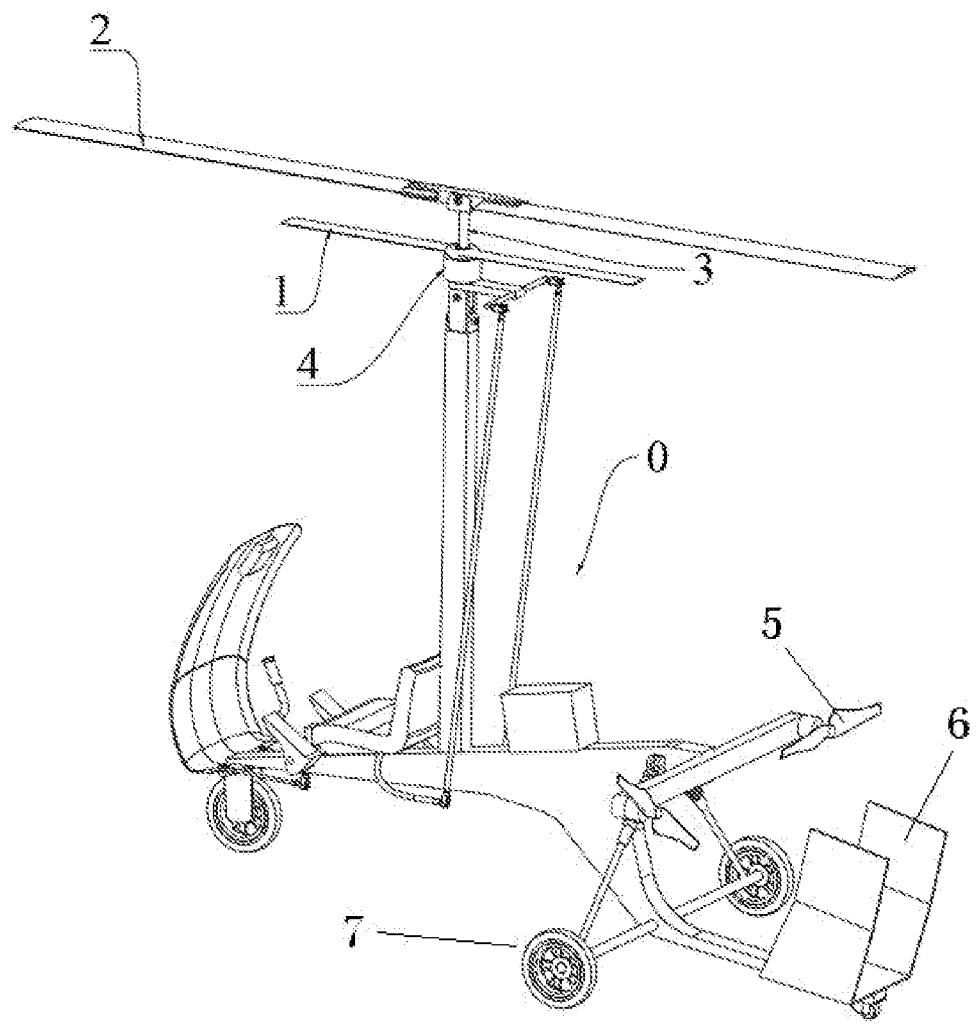
FIG. 6 is a schematic diagram illustrating an exemplary structure of the rotorcraft having the rotor wing driving structure in embodiment 1 of the present invention.
Figure 7:
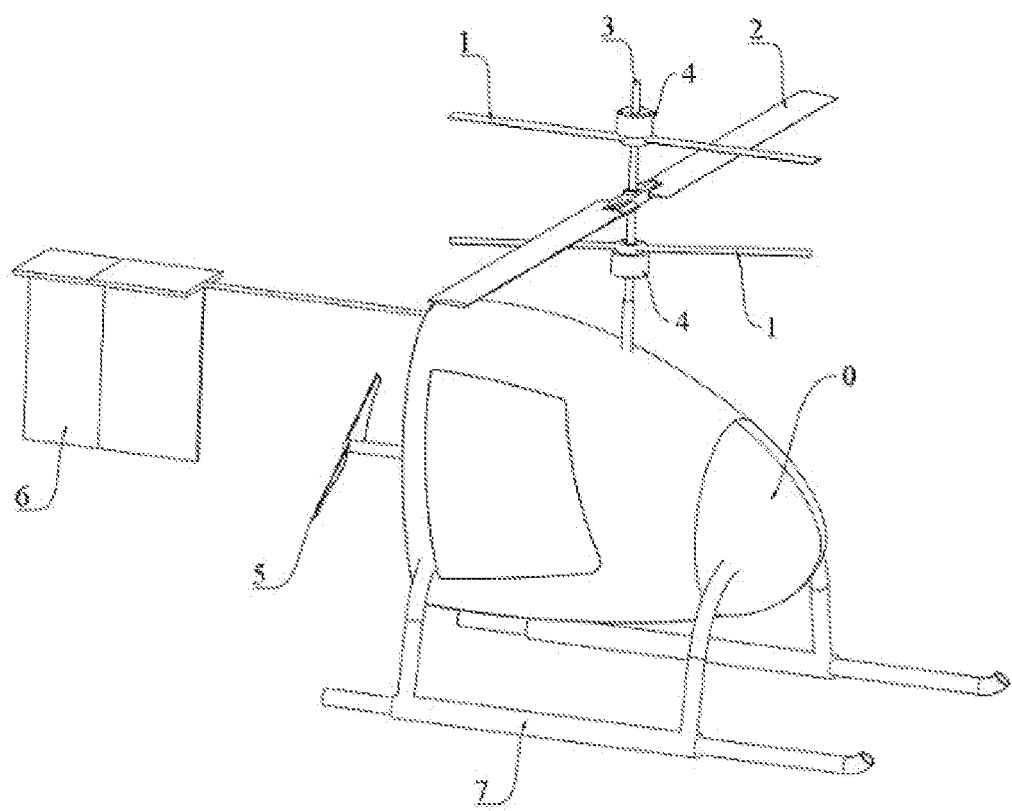
FIG. 7 is a schematic diagram illustrating an exemplary structure of the rotorcraft having the rotor wing driving structure in embodiment 3 of the present invention.
Figure 8:
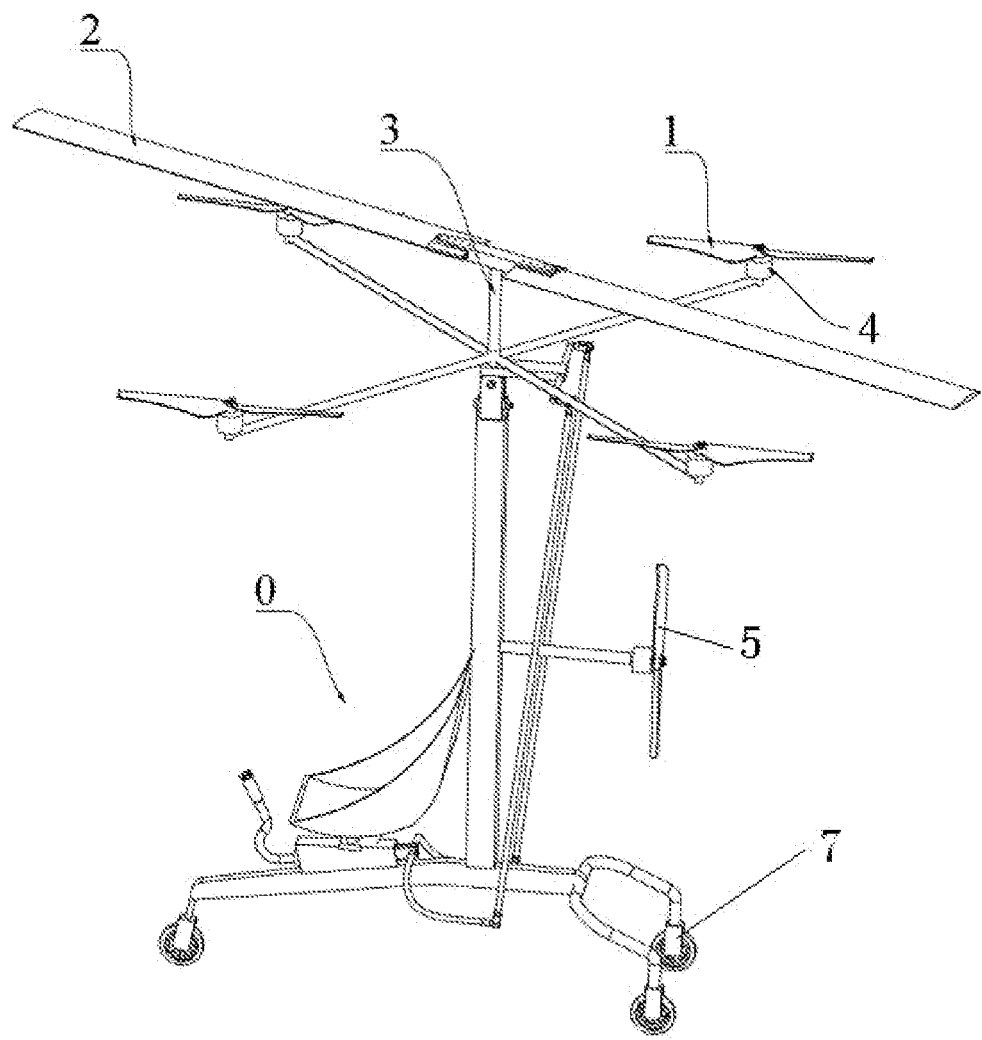
FIG. 8 is a schematic diagram illustrating an exemplary structure of the rotorcraft having the rotor wing driving structure in embodiment 4 of the present invention.

FIGS. 4 and 5 are schematic diagrams illustrating an exemplary structure of the small rotor wing 1 and the large rotor wing 2 in a non-coaxial state. In this state, there are a plurality of small rotor wings 1 and one large rotor wing 2. The plurality of small rotor wings 1 and the large rotor wing 2 are non-coaxially arranged, and the plurality of small rotor wings 1 are evenly distributed around the axis of the rotating shaft of the large rotor wing 2 and are close to the axis of the rotating shaft of the large rotor wing 2.

For example, the plurality of small rotor wings 1 are all arranged above the large rotor wing 2, and the projections of all the small rotor wings 1 on the rotation plane of the large rotor wing 2 are located in the middle area of the rotation plane of the large rotor wing 2. All the small rotor wings 1 blow air downwards to the large rotor wing 2, enabling the large rotor wing 2 to rotate passively.

Alternatively, as shown in FIG. 4, the plurality of small rotor wings 1 are all arranged below the large rotor wing 2, and all the small rotor wings 1 suck air downwards to enable the large rotor wing 2 to rotate passively.

Alternatively, as shown in FIG. 5, a plurality of small rotor wings 1 are arranged above and below the large rotor wing 2, wherein the plurality of small rotor wings 1 are evenly distributed around the axis of the rotating shaft of the large rotor wing 2 and are close to the axis of the rotating shaft of the large rotor wing 2. The small rotor wings 1 arranged above the large rotor wing 2 blow air to the large rotor wing 2, the small rotor wings 1 arranged below the large rotor wing 2 suck air from the large rotor wing 2, and the airflows enable the large rotor wing 2 to rotate.

The plurality of small rotor wings 1 simultaneously operate to generate a larger airflow, thereby achieving the purpose of increasing the rotation speed of the large rotor wing 2.

FIGS. 6-14 are schematic diagrams illustrating rotor wing driving structures with different shapes applied to a rotorcraft.

A rotorcraft possessing both active and passive rotation modes is an application of the driving method of the aforesaid rotor wings. This rotorcraft comprises a fuselage 0, wherein a tail portion of the fuselage 0 is provided with a propelling device 5 and a tail wing assembly 6. The tail wing assembly 6 further comprises a vertical tail wing and a horizontal tail wing. After the rotorcraft rises under the action of the rotor wing driving structure, the propelling device 5 operates to blow air backwards to enable the rotorcraft to move forward. The tail wing assembly 6 controls the flight direction and flight attitudes such as heading and pitching. A landing gear 7 is provided below the fuselage 0, and the landing gear 7 is a sled-type landing gear or a wheeled landing gear. The fuselage 0 is provided with any of the aforesaid rotor wing driving structures.

Figure 13:
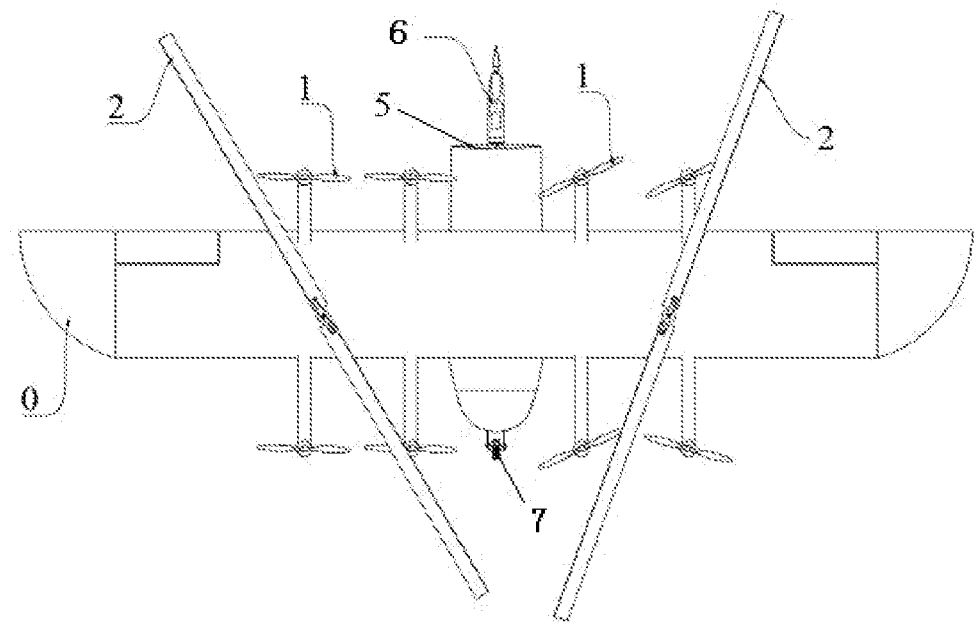
FIG. 13 is a schematic diagram illustrating a bottom view of the rotorcraft having two large rotor wings and a plurality of small rotor wings.
Figure 14:
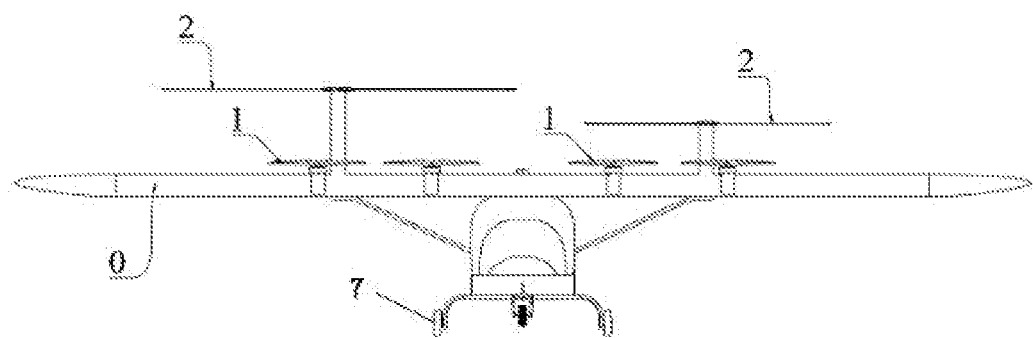
FIG. 14 is a schematic diagram illustrating a front view of the rotorcraft in FIG. 13.

FIGS. 13 and 14 are schematic diagrams illustrating an exemplary structure of another small rotor wing 1 combined with a large rotor wing 2 in a rotorcraft. In this structure, there are two large rotor wings 2. The rotation plane of the large rotor wings 2 and the rotation plane of the small rotor wings 1 are located on horizontal planes at different heights and are parallel to each other, which enables the small rotor wings 1 to rotate to generate an airflow such that the large rotor wings 2 are propelled to rotate. As shown in FIG. 14, the rotation planes of the two large rotor wings 2 are also respectively located on horizontal lines at different heights, which prevents the two large rotor wings 2 from colliding with each other while achieving a compact structure.

There is a plurality of small rotor wings 1. The small rotor wings 1 and the large rotor wings 2 are non-coaxially arranged, and the plurality of small rotor wings 1 are equally divided into two groups. The projection of one group of small rotor wings 1 on the rotation plane of one of the large rotor wings 1 is located in the middle area of the rotation plane of the corresponding large rotor wing 2. The projection of the other group of small rotor wings 1 on the rotation plane of the other large rotor wing 2 is located in the middle area of the rotation plane of the corresponding large rotor wing 2.

In this structure, the number of the small rotor wings 1 is eight. The eight small rotor wings are equally divided into two groups, meaning that there are four small rotor wings in each group. Each group of small rotor wings is correspondingly located below different large rotor wings 2, and the rotating directions of the two groups of small rotor wings 1 are opposite. Taking FIG. 3 as an example, the four small rotor wings 1 located on the left side of the fuselage 0 rotate counterclockwise to suck air downwards, so that the corresponding large rotor wing 2 also rotates counterclockwise. The four small rotor wings 1 located on the right side of the fuselage 0 rotate clockwise to suck air downwards, so that the corresponding large rotor wing 2 on the right side also rotates clockwise. The rotation speeds of the large rotor wings 2 are controlled by adjusting the rotation speeds of the two groups of small rotor wings 1, and the rotation speeds of the two large rotor wings 2 may also be controlled by adjusting the total distance of the blades of the two large rotor wings 2 (namely, the angle of attack), thereby adjusting the lifting force on the left side and the right side such that the flight attitudes are effectively controlled.

Figure 9:
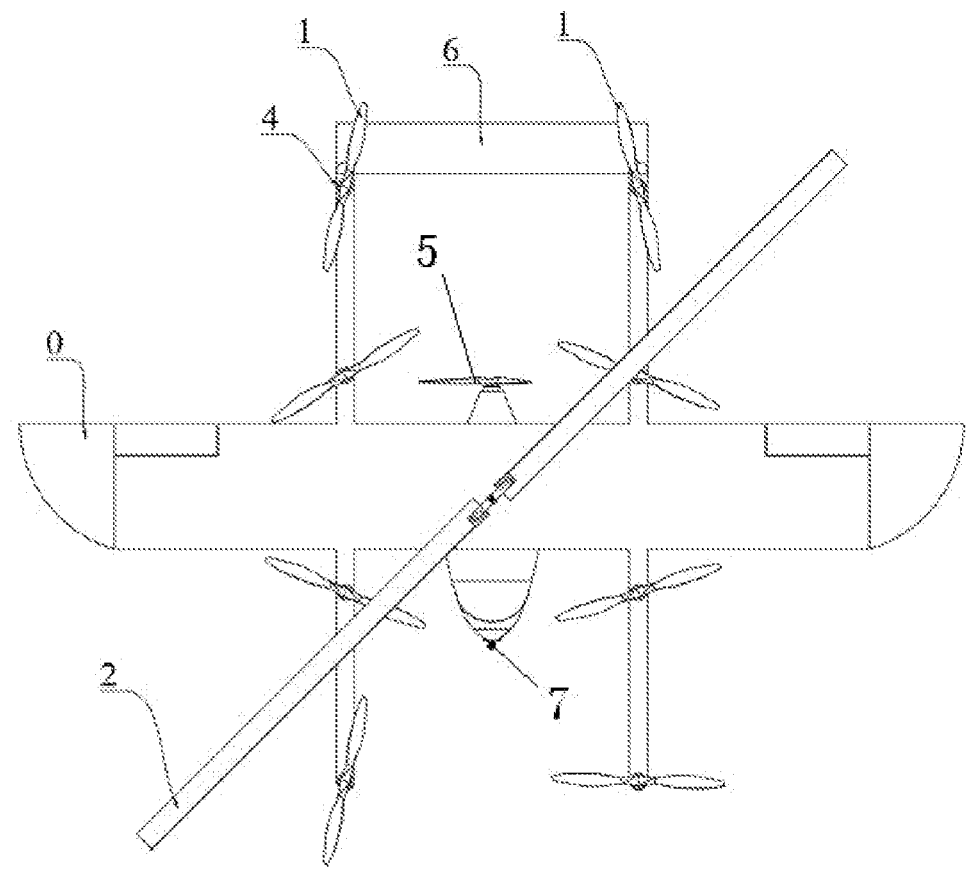
FIG. 9 is a schematic diagram illustrating a top view of the rotorcraft having one large rotor wing and a plurality of small rotor wings.
Figure 10:
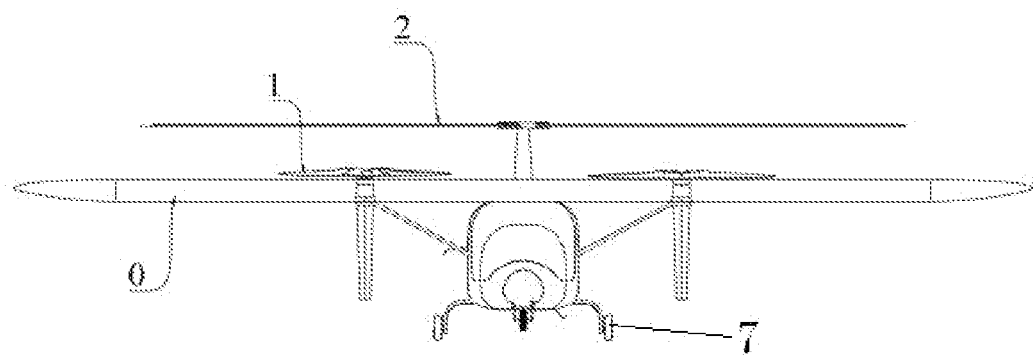
FIG. 10 is a schematic diagram illustrating a front view of the rotorcraft in FIG. 9.

FIGS. 9 and 10 are schematic diagrams illustrating an exemplary structure of another small rotor wing 1 combined with a large rotor wing 2 in a rotorcraft. The difference between the structure shown in FIGS. 9 and 10 and the structure shown in FIGS. 13 and 14 is that, in this structure, there is only one large rotor wing 2, and the two small rotor wings 1 are arranged in a longitudinal linear manner. This structure achieves the following benefits: the resistance is small during cruising, the structure is compact, the length of the fixed wings is shortened, and the efficiency of the fixed wings is improved. Especially, during cruising, the large rotor wing 2 may be locked such that the large rotor wing 2 cannot rotate or can only rotate very slowly. Thus, the resistance is significantly reduced. In this structure, the large rotor wing 2 serves a more important purpose: ensuring the safety when a forced landing occurs once a small rotor wing 1 fails. At this point, the large rotor wing 2 is completely relaxed, so that the large rotor wing 2 rotates quickly when the rotorcraft descends. Thus, a lifting force is generated to prevent the rotorcraft from dropping such that a forced landing at a low speed is achieved. The rotating directions of the left and right groups of small rotor wings 1 are also opposite, which helps keep balance when a certain small rotor wing 1 on the rotorcraft fails. Taking FIG. 9 as an example, when a small rotor wing 2 at the uppermost left side does not rotate due to a failure, the small rotor wing 2 arranged at the lowest right side is immediately stopped. In this way, the forces imposed on both sides of the fuselage 0 are balanced such that the fuselage 0 remains stable and does not tilt.

Figure 11:
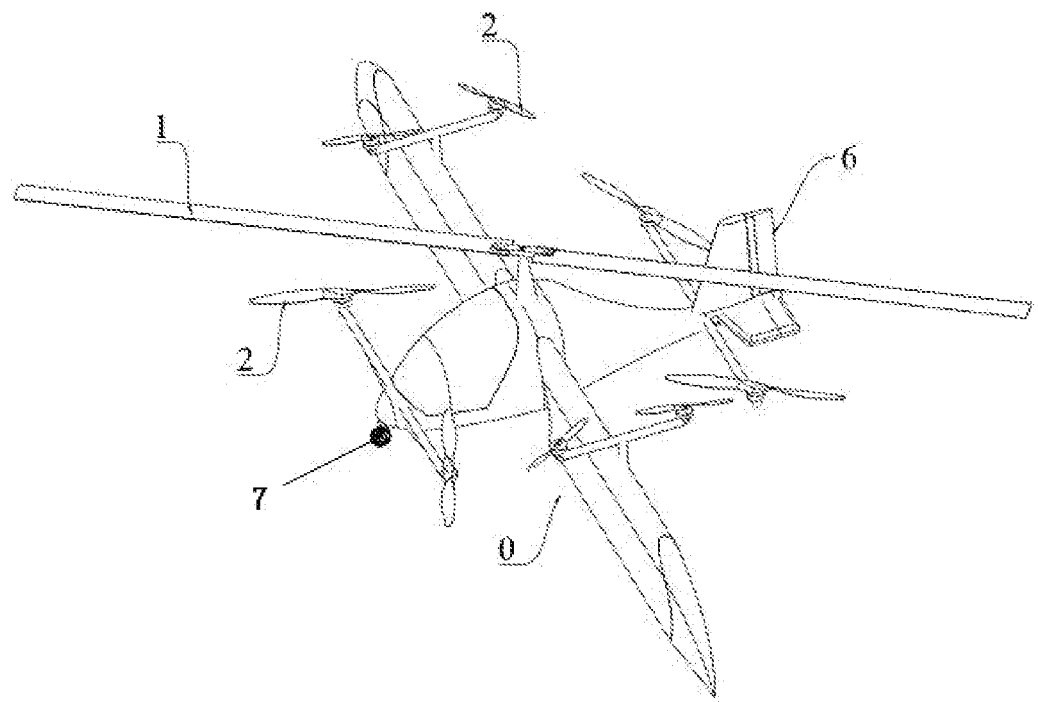
FIG. 11 is a schematic diagram illustrating an exemplary structure of the rotorcraft having one large rotor wing and a plurality of small rotor wings in a take-off, landing or hovering state.
Figure 12:
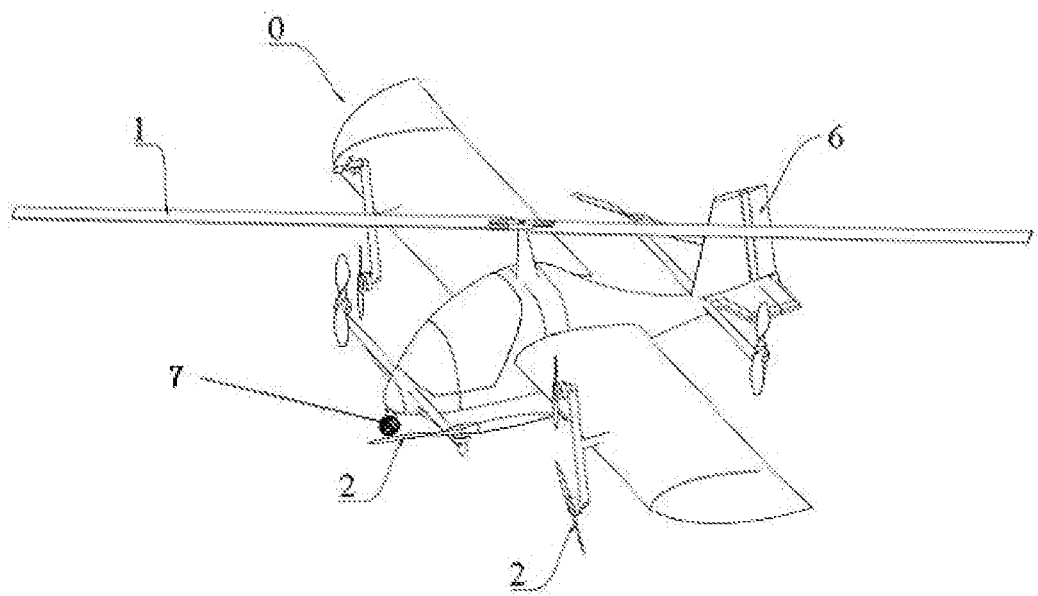
FIG. 12 is a schematic diagram illustrating an exemplary structure of the rotorcraft in FIG. 11 in a forward-moving state.

FIGS. 11 and 12 are schematic diagrams illustrating an exemplary structure of another small rotor wing 1 combined with a large rotor wing 2 in a rotorcraft. In this structure, the fuselage 0 comprises a tilting rotor wing, wherein the tilting rotor wing is rotatably connected to the fuselage 0. There is a plurality of small rotor wings 1, and when the small rotor wings 1 and the large rotor wings 2 are in a non-coaxial arrangement, some of the small rotor wings 1 are connected to the tilting rotor wing. As shown in FIG. 11, the tilting rotor wing is basically vertically arranged. At this point, the rotation plane of the small rotor wings 1 connected to the tilting rotor wing is horizontal, and the airflow generated during the rotation of small rotor wings faces downwards. The rotorcraft is in a vertical take-off and landing mode or in a hovering mode. After the rotorcraft takes off, the tilting rotor wing is rotated by 90° to a state shown in FIG. 12, and at this point, the airflow generated when the small rotor wings 1 connected to the tilting rotor wing rotate faces backwards, and a forward pulling force (pushing force) generated by the tilting rotor wing enables the rotorcraft to move forward. In this mode, the tilting rotor wing is used to generate a lifting force. Preferably, the small rotor wings 1 connected to the tilting rotor wing adopt a propeller structure, and more preferably, a pitch propeller is adopted in this structure for improving the propelling efficiency. Further, those small rotor wings 1 not connected to the tilting rotor wing are controlled by using an independent flight controller. Those small rotor wings 1 mainly serve the following purposes: generating a lifting force, maintaining the rotation of the large rotor wings 2, balancing the fuselage 0 while preventing deflection, and controlling the flight direction when the rotorcraft does not reach a flat flight speed or flies at a low flat flight speed. The rotation of the tilting rotor wing is realized electrically or manually, and the manual control is achieved by controlling an operation lever connected to the rotating shaft of the tilting rotor wing. A pilot may control the operation lever to enable the tilting rotor wing to rotate by 90°, thereby making the tilting rotor wing switch between a substantially vertical position and a substantially horizontal position. Meanwhile, the rotation plane of the small rotor wings 1 connected to the tilting rotor wing is switched between a horizontal position and a vertical position, thereby controlling the flight attitudes of the rotorcraft.

It should be noted that the aforesaid are merely preferred embodiments of the present invention and are not intended to limit the present invention. Although the present invention has been described in detail with reference to the embodiments, it is still possible for those skilled in the art to modify the technical solutions described in the aforesaid embodiments or replace some of the technical features therein. Therefore, any modifications, equivalent replacements and improvements made within the spirit and principle of the present invention shall fall into the scope defined by the claims of the present invention.

The invention claimed is:

1. A structure for transmitting power based on aerodynamic deceleration, comprising: at least one large rotor wing,
   at least one small rotor wing,
   a main shaft, and
   a power assembly, wherein diameter of the large rotor wing is greater than that of the small rotor wing, wherein the large rotor wing is rotatably connected to the main shaft, and the large rotor wing rotates freely around the main shaft, wherein the small rotor wing is connected to the power assembly, wherein the rotation plane of the large rotor wing and the rotation plane of the small rotor wing are parallel to each other, and an airflow generated by the rotation of the small rotor wing propels the large rotor wing to rotate.

2. The structure for transmitting power based on aerodynamic deceleration of claim 1, wherein the clearance distance between the small rotor wing and the large rotor wing is less than or equal to three times the maximum chord length of the large rotor wing.

3. The structure for transmitting power based on aerodynamic deceleration of claim 1, wherein the blades of the large rotor wing are configured to be airfoil-shaped, and the mounting angle of the blades of the large rotor wing ranges from −2° to 6°.

4. The structure for transmitting power based on aerodynamic deceleration of claim 1, wherein the mounting angle of the blades of the large rotor wing within the projection area of the small rotor wing ranges from 0° to 6°, and the mounting angle of the blades of the large rotor wing outside the projection area of the small rotor wing ranges from −2° to 6°.

5. The structure for transmitting power based on aerodynamic deceleration of claim 1, wherein the number of the large rotor wing is one and the number of the small rotor wing is also one, wherein the small rotor wing and the large rotor wing are coaxially arranged, wherein the small rotor wing is arranged above or below the large rotor wing.

6. The structure for transmitting power based on aerodynamic deceleration of claim 1, wherein the number of the large rotor wing is one, the number of the small rotor wing is two, and the small rotor wings and the large rotor wing are coaxially arranged, wherein the two small rotor wings are respectively arranged above and below the large rotor wing.

7. The structure for transmitting power based on aerodynamic deceleration of claim 1, wherein there are at least two small rotor wings and one large rotor wing, wherein the at least two small rotor wings and the large rotor wing are non-coaxially arranged, and the at least two small rotor wings are evenly distributed around the axis of the rotating shaft of the large rotor wing, wherein the projections of all the small rotor wings on the rotation plane of the large rotor wing are located in the middle area of the rotation plane of the large rotor wing, wherein the at least two rotor wings are arranged above or below the large rotor wing.

8. The structure for transmitting power based on aerodynamic deceleration of claim 1, wherein there are two large rotor wings and a at least two rotor wings, wherein the small rotor wings and the large rotor wings are non-coaxially arranged, wherein the rotation plane of the large rotor wing and the rotation plane of the small rotor wing are located on horizontal planes at different heights and are parallel to each other, wherein the rotation planes of the two large rotor wings are also located on horizontal planes at different heights, wherein the at least two small rotor wings is equally divided into two groups, wherein the projection of one group of small rotor wings on the rotation plane of one of the large rotor wings is located in the middle area of the rotation plane of the corresponding large rotor wing, wherein the projection of the other group of small rotor wings on the rotation plane of the other large rotor wing is located in the middle area of the rotation plane of the corresponding large rotor wing, wherein the rotation areas of the two large rotor wings are overlapped but the blades of the two large rotor wings do not collide with each other, wherein the rotation directions of the two groups of small rotor wings are opposite.

9. The structure for transmitting power based on aerodynamic deceleration of claim 1, wherein the sum of the rotation areas of all the small rotor wings is less than one half of the sum of the rotation areas of all the large rotor wings.

10. A rotorcraft possessing both active and passive rotation modes, which is an application of the driving method of the aforesaid rotor wings, comprising:
   a fuselage,
   a propelling device, and
   a landing gear, wherein the fuselage is provided with the aforesaid rotor wing driving structure for transmitting power based on aerodynamic deceleration of claim 1.

11. The rotorcraft possessing both active and passive rotation modes of claim 10, wherein the fuselage further comprising fixed rotor wings.

12. The rotorcraft possessing both active and passive rotation modes of claim 10, wherein the fuselage further comprising:
   a tilting rotor wing, wherein the tilting rotor wing is rotatably connected to the fuselage, wherein there is a plurality of small rotor wings, and the small rotor wings and the large rotor wings are in a non-coaxial arrangement, wherein some of the small rotor wings are connected to the tilting rotor wing and are capable of tilting along with the tilting rotor wing.

* * * * *